(12) United States Patent
Halbauer et al.

(10) Patent No.: US 8,396,426 B2
(45) Date of Patent: Mar. 12, 2013

(54) MULTICARRIER MOBILE DEVICE

(75) Inventors: Hardy Halbauer, Ettlingen (DE); Jürgen Otterbach, Stuttgart (DE)

(73) Assignee: Alcatel Lucent, Paris (FR)

( * ) Notice: Subject to any disclaimer, the term of this patent is extended or adjusted under 35 U.S.C. 154(b) by 852 days.

(21) Appl. No.: 12/372,790

(22) Filed: Feb. 18, 2009

(65) Prior Publication Data

US 2009/0209207 A1    Aug. 20, 2009

(30) Foreign Application Priority Data

Feb. 19, 2008    (EP) .................................... 08290170

(51) Int. Cl.
*H04B 15/00*    (2006.01)

(52) U.S. Cl. ...................................................... 455/63.1

(58) Field of Classification Search ............... 455/550.1, 455/552.1, 553.1, 63.1, 67.11, 426.1, 452.1, 455/45, 63.2, 63.3, 423, 425, 446, 452.2, 455/456.3–456.6, 67.13, 132, 296
See application file for complete search history.

(56) References Cited

U.S. PATENT DOCUMENTS 7,010,320 B2 * 3/2006 Komatsu ................... 455/67.11
8,036,669 B2 * 10/2011 Dong et al. ................. 455/447

FOREIGN PATENT DOCUMENTS

CN    101052196 A    10/2007

OTHER PUBLICATIONS

Chinese Office Action dated Dec. 12, 2011.
Caffery, Jr., "Wireless Location in CDMA Cellular Radio Systems," Kluwer Academic Publishers, XP002493184, pp. 26-30, Jan. 1, 2000.
Nortel, "Discussion on the DL Interference Coordination," 3GPP TSG-RAN WG1#50, XP002493183, pp. 1-10, Aug. 24, 2007.
European Search Report, Sep. 15, 2008.

* cited by examiner

*Primary Examiner* — Khanh V Nguyen
(74) *Attorney, Agent, or Firm* — Fay Sharpe LLP

(57) ABSTRACT

The invention relates to a multicarrier mobile device comprising a receiver (101) for receiving a first multicarrier signal being associated with a first communication cell and a second multicarrier signal being associated with a second communication cell, an extractor (103) for extracting a first signal portion from the first multicarrier signal and for extracting a second signal portion from the second multicarrier signal and a processor (105) for determining a first interference power on the first signal portion and the second interference power on the second signal portion.

5 Claims, 3 Drawing Sheets

MULTICARRIER MOBILE DEVICE

The invention is based on a priority application EP 08 290 170.3 which is hereby incorporated by reference.

TECHNICAL FIELD

The present invention relates to multicarrier transmission systems.

BACKGROUND OF THE INVENTION

Usually, mobile communication devices communicate via base stations arranged within communication cells of e.g. a multicell communication scenario. Each base station is associated with one or more sectors and serves mobile communication devices arranged within the sectors boundary.

In order to achieve a maximum throughput in a multicell environment, e.g. in a WiMAX multicell environment (WiMAX: World wide Interoperability for Microwave Access), frequency reuse schemes are employed, which reuse the same carrier frequency in sectors at low distance or even in the neighbour sector of the served mobile communication device. This causes high interference and therefore requires the deployment of interference coordination methods. Usually, known interference coordination methods rely on the knowledge of the positions or locations of the terminals in combination with measurements of an interference level within a sector to enable an interference minimizing assignment of resources e.g. in terms of sub-channels, time slots or other orthogonal resource units. However, the position (location) information e.g. in current WiMAX systems can only be derived if beamforming with a perfectly calibrated antenna array is used. If antenna configurations other than beam forming arrays are used, e.g. multiple input/multiple output systems with separated antennas or cross-polarized arrays, then the position (location) information cannot be derived from the antenna signal. Furthermore, the interference measurement methods currently used provide a total interference power with respect to all neighbouring sectors and the signal power associated with the wanted sector. It is not possible to derive any location information from this interference measurement.

SUMMARY OF THE INVENTION

It is the object of the invention to provide an efficient concept enabling determining a position of a mobile station within a sector.

This object is achieved by the features of the independent claims.

The invention is based on the finding that a position of a mobile station can efficiently be determined upon a basis of interference measurements when certain sub-carriers of signals used in neighbouring sectors are exploited for separately measuring the interference power. In accordance with the IEEE 802.16 standard for mobile stations, the certain signal portions may correspond to preamble sub-carriers used in neighbouring sectors which may be used for determining the carrier to interference plus noise ratio (CINR) from each preamble.

Usually, the neighbouring sectors use different, e.g. orthogonal, sets of sub-carriers for transmitting the preamble portions. Thus, for each subset of sub-carriers, e.g. for two or three subsets of sub-carriers associated with different sectors of a multicell scenario, specific interference measurements can be performed. Each interference measurement may then be reported e.g. as an interference value to a base station. Based on the interference measurements per subcarrier subset, a location of the mobile station within the sector can be determined and, furthermore, interference coordination methods exploiting the location information may be applied. Additionally, also a transmit power level (Rx) of the mobile station can be used which may e.g. provide a distance information of the mobile station with respect to the base station.

The invention exploits the further finding that a measurement of an interference power on each orthogonal preamble carrier set corresponds to the interference experienced at the mobile station which may perform the above outlined measurements of interference from each neighbouring sector associated with the respective base station. Thus, separately reporting the interference measurements results for each neighbouring sector enables the base station to determine which sectors significantly contribute to the interference at the mobile station. Based upon the measurement of the interference power, a closest sector with respect to the position of the mobile terminal can be identified. Thus, information on the position of the mobile terminal can be obtained from the interference power measurements which can also be used to assign the available resources such that the impact of interference on the transmission is minimized.

According to an aspect, the invention relates to a multicarrier mobile device comprising a receiver for receiving a first multicarrier signal being associated with a first communication cell or sector and a second multicarrier signal being associated with a second communication cell or sector, an extractor for extracting a first signal portion from the first multicarrier signal and for extracting a second signal portion from the second multicarrier signal and a processor for determining a first interference power on the first signal portion and the second interference power on the second signal portion.

According to an embodiment, the multicarrier mobile device may be located within the first, second or third communication cell or sector.

According to an embodiment, the receiver is further configured to receive a third multicarrier signal being associated with a third communication cell or sector, wherein the extractor is configured to extract a third signal portion being associated with a third communication cell or sector and wherein the processor is configured to determine a third interference power on the third signal portion.

According to an embodiment, each signal portion is an orthogonal preamble carrier set associated with a respective communication cell or sector.

According to an embodiment, the multicarrier mobile device may further comprise a transmitter for transmitting the determined interference powers. The transmitter may be the common transmitter usually used for communications. However, the transmitter may also be a further, separate transmitter.

According to an embodiment, the multicarrier mobile device further uses its uplink communication channel to transmit the determined interference powers to its base station.

According to an embodiment, the signal portions are associated with different sub-carriers of a multicarrier transmission scheme.

According to an aspect, the invention relates to a base station comprising a receiver for receiving, from a mobile device, a first interference value relating to an interference power being associated with a first communication cell and a second interference value relating to an interference power being associated with a second communication cell, and a processor for determining information on a position of the mobile device upon a basis of the first interference value and the second interference value. The receiver may be the common receiver usually used for communications. However, the receiver may also be a further, separate receiver. For example, the base station receives an uplink signal and extracts the interference power values from this signal. The base station e.g. receives an uplink signal and extracts the interference power values from this signal.

According to an embodiment, the receiver is configured to receive, from the mobile device, a third interference value relating to an interference power being associated with a third communication cell or sector and the processor is configured to determine information on the position of the mobile device upon a basis of the first interference value, the second interference value and the third interference value.

According to an embodiment, the processor is configured to determine information on the position of the mobile device upon a basis of an evaluation of the interference values.

According to an aspect, the invention relates to a multicarrier communication method comprising receiving a first multicarrier signal being associated with a first communication cell or sector and a second multicarrier signal being associated with a second communication cell or sector, extracting a first signal portion from the first multicarrier signal, extracting a second signal portion from the second multicarrier signal and determining a first interference power on the first signal portion and the second interference power on the second signal portion.

According to an aspect, the invention relates to a method for determining information on a position or location of a mobile device, the method comprising receiving, from the mobile device, a first interference value relating to an interference power being associated with a first communication cell or sector and a second interference value relating to an interference power being associated with a second communication cell or sector, and determining information on a position of the mobile device upon a basis of the first interference value and the second interference value.

According to an aspect, the invention relates to a method for determining information related to a location of a mobile terminal in a multicarrier system being configured to reuse all available frequency, wherein a plurality of sectors is defined around each base station and wherein a predefined preamble carrier set is associated to each sector. The method comprises determining the interference power experience on each preamble carrier set at a mobile terminal, transmitting separately the interference power for each of the preamble carrier sets to the base station and, depending on a level of the interference power measured for said different preamble carrier sets, determining information related to the location of the mobile terminal.

BRIEF DESCRIPTION OF THE DRAWINGS

Further embodiments of the invention will be described with respect to the following figures in which.

DETAILED DESCRIPTION OF PREFERRED EMBODIMENTS

Figure 1:
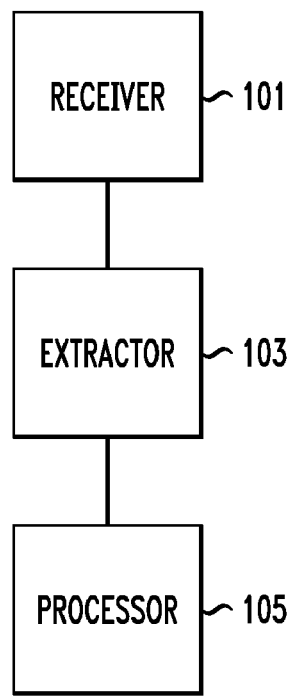
FIG. 1 shows a block diagram of a mobile device.

FIG. 1 shows a multicarrier mobile device comprising a receiver 101, e.g. a wireless receiver according to the WiMAX approach, for receiving signals being associated with e.g. different communication cells. The receiver 101 is coupled to an extractor 103 extracting certain signal portions from the different multicarrier signals associated with different communication cells. For example, the extractor 103 extracts the different multicarrier sets in order to extract a respective preamble associated with a respective multicarrier signal of a respective communication cell. The extractor 103 is coupled to a processor 105 which determines interference powers on the extracted signal portions.

The mobile device of FIG. 1 may further comprise a transmitter which transmits the determined interference powered or interference values to a base station which is currently employed for communication. Preferably, no separate transmitter is used as the signals may be transmitted within the normal communication channel as a specific message.

Figure 2:
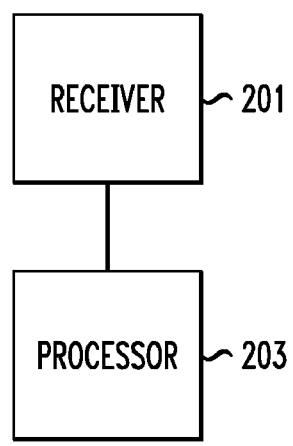
FIG. 2 shows a block diagram of a base station.

FIG. 2 shows a block diagram of a base station having a receiver 201 for receiving interference values from the mobile device. The interference values are provided to a processor 203 which determines information on a position of the mobile device upon a basis of the received interference values. For example, the processor 203 compares the interference values in order to determine the position information.

Figure 3:
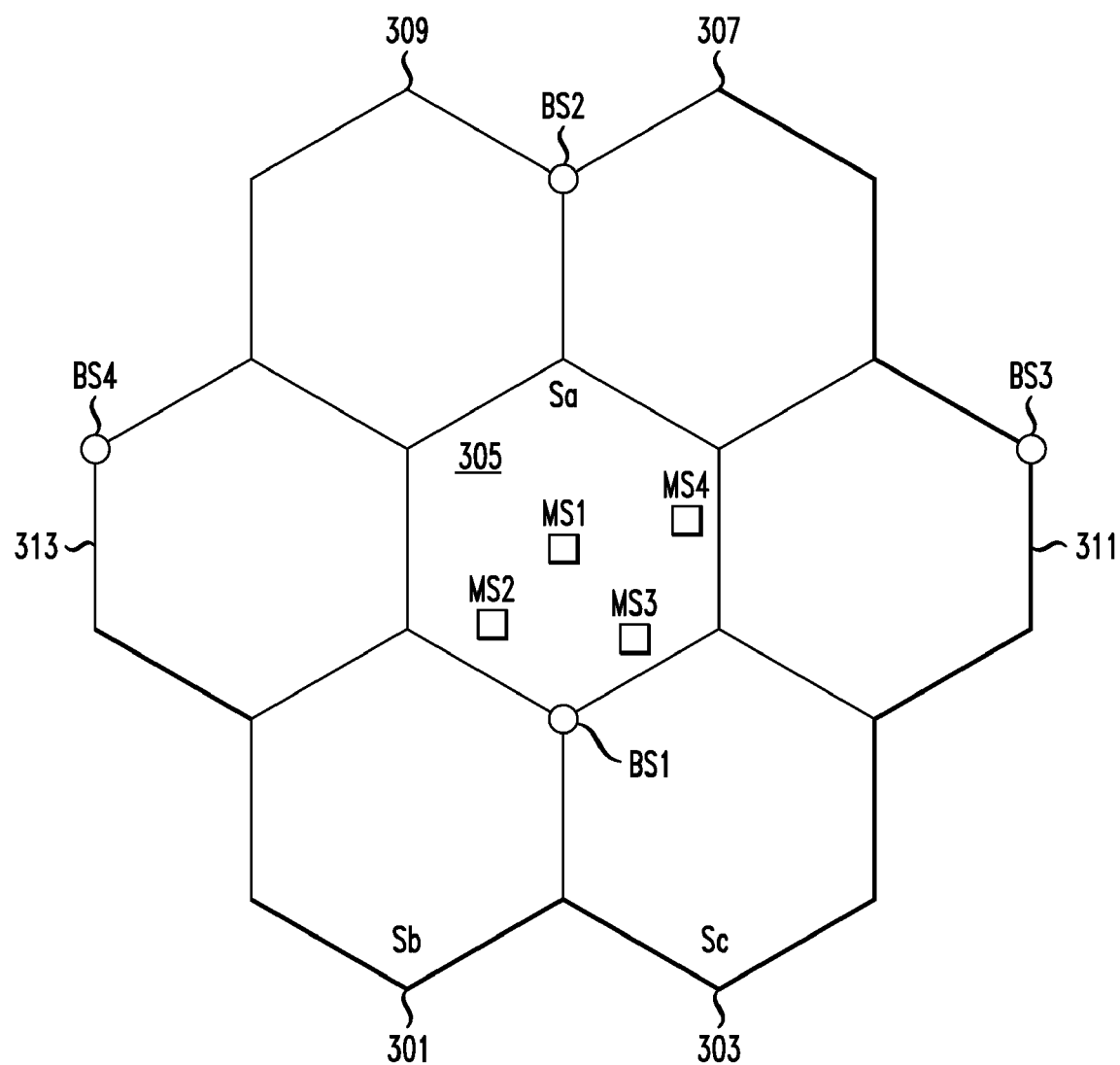
FIG. 3 shows a multicell communication scenario.

FIG. 3 shows a part of a cellular network by way of example. The cellular network comprises a plurality of sectors, a plurality of base stations and a plurality of mobile stations, by way of example. In particular, a first base station BS1 is arranged between a sector 301, 303 and 305. A second base station BS2 is arranged between the sectors 307 and 309. A third base station BS3 is associated with a sector 311. A fourth base station BS4 is associated with a sector 313.

Figure 4:
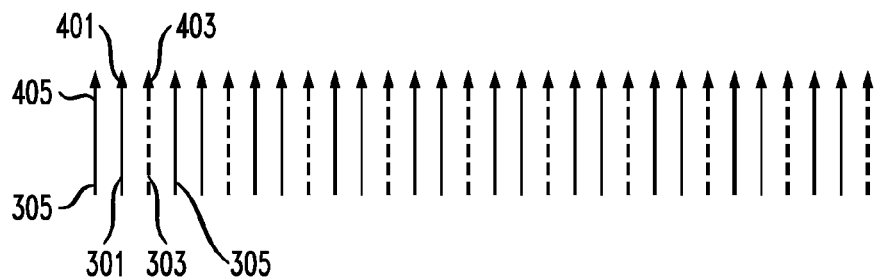
FIG. 4 shows preamble carrier sets.

By way of example, four mobile stations MS1, MS2, MS3, and MS4 are arranged within the sector 305. For example, if a frequency reuse factor FR=1 is chosen, then all base stations will use the same radio frequency band or channel so that a particular mobile station in such a network will receive multiple base station signals according to the downlink path loss. According to the WiMAX specification, each base station uses specified preamble carrier set (PC-S) in each downlink signal as depicted in FIG. 4. Furthermore, the preamble carrier sets 401, 403 and 405 associated with the sectors 301, 303 and 305 of the 3 sectors associated to one BS are orthogonal.

FIG. 4 demonstrates the arrangement of preamble carrier sets associated with the sectors 305, 301 and 303. Thus, two subsequent sub-carriers associated with a certain sector are separated by two sub-carriers associated with different sector. Hence, preamble carrier sets associated with different sectors are associated with different frequencies.

Figure 5:
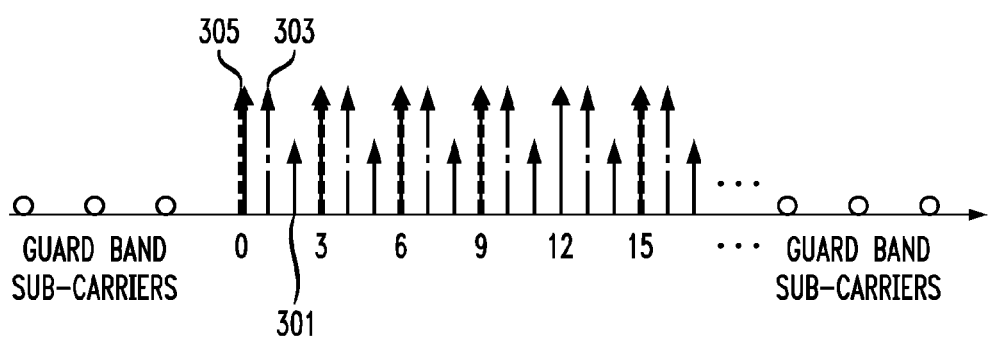
FIG. 5 demonstrates intersector interference.
Figure 6:
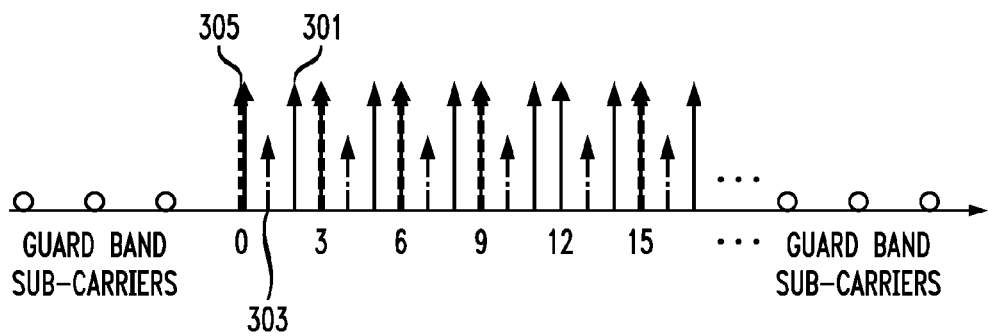
FIG. 6 demonstrates intersector interference.

FIGS. 5 and 6 schematically depict interference powers on different preamble sets of sectors 305, 301, and 303. As depicted e.g. in FIG. 5, the interference caused by the sector 301 with respect to e.g. the mobile station MS3 is lower than a wanted signal, wherein the interference from the sector 303 is approximately the same as the preamble in sector 305. The corresponding interference situation for the mobile station MS2 is depicted in FIG. 6. For example, the interference caused by the sector 303 is lower than the interference caused by the sector 301.

Thus, those mobile stations which are arranged e.g. within the sector 305 and which measure a high interference value resulting from the sector 301 and a low or lower interference value from the sector 303 are located at a sector boarder between the sectors 305 and 301, e.g. on the left hand half the sector. This angular directional information enables the interference coordination not only for beam forming scenarios but also for every possible communication scenario. For example, a simple coordination may be achieved if all base stations schedule with the same physical sub-channels for mobile stations arranged in the left half of a respective sector and schedule another set of the same physical channels for mobile stations which are arranged in the right half of the corresponding sector. This approach may be applied in general for all multicarrier systems having preamble sets which do not use all sub-carriers simultaneously.

The inventive approach further enables a throughput increase with interference coordination based on location information for multicarrier systems upon a basis of orthogonal preambles without the restrictions to beam forming schemes. The inventive approach may be applied for multiple input/multiple output and single antenna base stations and can be further employed for improving the known beam forming solutions. Furthermore, the inventive concept is associated with an improved throughput due to the improved interference coordination based on the mobile station location which may also be employed in existing WiMAX systems which are not based on beam forming like e.g. multiple input/multiple output systems or two element antenna systems. Furthermore, the network's performance may be increased without significantly increasing the system's complexity. In particular, separate physical layer measurements are to be performed at a corresponding mobile station which transmits the measurement results to the corresponding base station. This approach may further be combined with an updated scheduling algorithm.

The invention claimed is:

1. A multicarrier mobile device, comprising:
 a receiver for receiving a first multicarrier signal being associated with a first communication cell and a second multicarrier signal being associated with a second communication cell;
 an extractor for extracting a first signal portion from the first multicarrier signal and for extracting a second signal portion from the second multicarrier signal, the signal portions being associated with different subcarriers of a multicarrier transmission scheme; and
 a processor for determining a first interference power on the first signal portion and the second interference power on the second signal portion.

2. The multicarrier mobile device according to claim 1, the receiver being further configured to receive a third multicarrier signal being associated with a third communication cell, the extractor being configured to extract a third signal portion being associated with a third communication cell, the processor being configured to determine a third interference power on the third signal portion.

3. The multicarrier mobile device according to claim 1, each signal portion being an orthogonal preamble carrier set associated with a respective communication cell.

4. The multicarrier mobile device according to claim 1, further comprising a transmitter for transmitting the determined interference powers.

5. A multicarrier communication method, comprising:
 receiving a first multicarrier signal being associated with a first communication cell and a second multicarrier signal being associated with a second communication cell;
 extracting a first signal portion from the first multicarrier signal;
 extracting a second signal portion from the second multicarrier signal; and
 determining a first interference power on the first signal portion and a second interference power on the second signal portion, wherein the signal portions are associated with different subcarriers of a multicarrier transmission scheme.

* * * * *